(12) United States Patent
Zavarehei

(10) Patent No.: US 8,666,092 B2
(45) Date of Patent: Mar. 4, 2014

(54) NOISE ESTIMATION

(75) Inventor: Esfandiar Zavarehei, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 723 days.

(21) Appl. No.: 12/750,511

(22) Filed: Mar. 30, 2010

(65) Prior Publication Data

US 2011/0243349 A1 Oct. 6, 2011

(51) Int. Cl.
*H04B 15/00* (2006.01)

(52) U.S. Cl.
USPC .......................................... 381/94.2; 381/94.3

(58) Field of Classification Search
USPC .............. 704/226–228; 381/1–16, 94.1–94.4, 381/94.7, 71.14
See application file for complete search history.

(56) References Cited

U.S. PATENT DOCUMENTS

| | | | |
|---|---|---|---|
| 6,804,640 B1* | 10/2004 | Weintraub et al. | 704/226 |
| 7,031,478 B2* | 4/2006 | Belt et al. | 381/92 |
| 7,054,808 B2* | 5/2006 | Yoshida | 704/226 |
| 7,158,932 B1* | 1/2007 | Furuta | 704/226 |
| 7,702,307 B2* | 4/2010 | Taipale et al. | 455/226.3 |
| 7,774,203 B2* | 8/2010 | Wang et al. | 704/254 |
| 7,797,154 B2* | 9/2010 | Ichikawa | 704/226 |

OTHER PUBLICATIONS

Cohen et al, "Speech Enhancement for non-stationary noise environments", Jun. 2001, Signal Processing—vol. 81, pp. 2403-2418.*
Diethorn, "Subband Noise reduction methods for sppech enhancement", 2004, Avaya Labs.*

* cited by examiner

*Primary Examiner* — Mohammad Islam
*Assistant Examiner* — David Ton
(74) *Attorney, Agent, or Firm* — Vincent M DeLuca

(57) ABSTRACT

A method and apparatus are provided for estimating the noise spectrum of an audio signal occupying a certain frequency range. The amplitude of the audio signal is measured at only a subset of the frequency range having a low expected signal to noise ratio at the time of measuring such that the measured amplitude is indicative of noise amplitude at that subset of the frequency range. A predefined noise spectral shape is then adapted by fitting to the noise amplitude so as to form the estimated noise spectrum. The noise spectrum so estimated is used to remove interference noise from the audio signal.

29 Claims, 11 Drawing Sheets

701 — calculating the logarithm of each of a plurality of amplitudes of the predefined noise spectral shape within the subset of the audio signal's frequency range 702 — applying the frequency dependent weighting factor to the calculated logarithm values to form a weighted average of the logarithm amplitude of the predefined noise spectral shape 703 — determining the difference between the estimate of the noise level and the weighted average 704 — determining the estimated noise at a frequency, f, as $10^x$ where x is the logarithm of the predefined noise spectral shape at the frequency, f, minus the determined difference

Figure 7

NOISE ESTIMATION

FIELD OF THE INVENTION

This invention relates to estimating the noise amplitude spectrum of an audio signal, in particular of a frequency modulated audio signal.

BACKGROUND OF THE INVENTION

During transmission, a signal picks up noise interference. It is desirable to suppress or remove the noise in a received signal so as to improve the quality of the received signal. In order to suppress or remove noise from the received signal, the noise spectrum of the received signal is first estimated.

Conventional methods for estimating the noise spectrum of a speech signal use a voice activity detector (VAD) to identify frames of the signal that do not contain any speech. The signal amplitude in each of these frames is indicative of the noise amplitude in that frame. Hence by measuring the signal amplitude in such frames, the receiver can estimate the noise spectrum of the speech signal and track changes in it.

More advanced methods make use of "minimum statistics" for estimating the noise spectrum of a speech signal. Minimum statistics methods track the minimum signal amplitude in the speech signal. The minimum signal amplitude occurs at frames/bins which do not contain any speech. In these frames/bins the signal amplitude is indicative of the noise amplitude in that frame/bin. Hence minimum statistics methods track the noise spectrum in a speech signal.

Both the conventional methods and the more advanced methods discussed above rely on occasional short time intervals in the time-frequency plane of the signal spanning the entire frequency spectrum in which there are no desired signal (i.e. speech) components to the signal. Furthermore these algorithms estimate the noise spectral amplitude of each frequency bin independently of other frequency bins. Hence the methods are able to measure the signal amplitude in these short time intervals and use these measurements to estimate the noise spectrum.

FM (frequency modulated) signals often contain music. Typically, frames in a music signal in which there is no music component to the signal are infrequent. This characteristic, however, is less evident in higher frequencies. In some cases the music signal is uninterrupted in time along its entire duration. Consequently, the above described methods of estimating the noise spectrum are unlikely to be accurate for music signals. In the case of a minimum statistics method, the method is usually set up such that a parameter defines the maximum duration of continuous presence of a signal. In the case of a music signal, this parameter would be high to take into account the fact that pauses in the music signal are infrequent. However the parameter taking a high value reduces the ability of the method to accurately and quickly track changes in the noise spectrum because the measurements taken of the signal indicative of noise estimates are infrequent. Additionally, if a portion of the music signal lasts uninterrupted for longer than the specified maximum duration, the method will measure the minimum of the music signal and use this to estimate the noise spectrum. If the estimated noise spectrum is then used to suppress or remove the noise component from the signal, the resulting signal will be severely distorted.

Typical noise compensation methods used to improve the quality of FM signals are directed either at improving the hardware receiving the FM signal or at using software for post-processing of the FM signal to hide the effects of noise in the signal. In general, these methods are not directed at estimating the noise spectrum and suppressing or removing it from the signal. Improvements to the receiving hardware are aimed at improving the received signal strength indication (RSSI). Software techniques include soft mute, adaptive low-pass filtering and mono/stereo blending. These software techniques all remove the wanted signal in addition to the unwanted noise. For example, low-pass filtering suppresses the high frequency content of the signal and allows the low frequency content to pass through. Since most of the wanted signal occupies lower frequencies, the overall signal to noise ratio (SNR) increases. However, if there is substantial high frequency content to the wanted signal then the quality of the signal will reduce considerably since this content is suppressed by the low-pass filter. Additionally, this method does not remove the noise from the frequency bands passed by the low-pass filter. Although widely implemented, these software post-processing methods do not improve the quality of the signal as much as would be possible by estimating the noise spectrum and suppressing or removing it from the signal.

There is thus a need for an improved method of estimating the noise spectrum of a signal, particularly of an FM signal.

SUMMARY OF THE INVENTION

According to a first aspect of the invention, there is provided a method of estimating the noise spectrum of an audio signal, the audio signal occupying a frequency range, the method comprising: measuring amplitude of the audio signal at only a subset of the frequency range, the subset having a low expected signal to noise ratio at the time of measuring such that the measured amplitude is indicative of noise amplitude at that subset of the frequency range; and adapting a predefined noise spectral shape by fitting to the noise amplitude so as to form the estimated noise spectrum.

Suitably, the audio signal is a frequency modulated audio signal and the method further comprises prior to the measuring step demodulating the frequency modulated audio signal to form a demodulated audio signal, wherein the measuring step is performed on the demodulated audio signal.

Suitably measuring amplitude comprises measuring a plurality of amplitudes of the audio signal, each at a different frequency in the subset of the frequency range.

Suitably, the method further comprises applying a frequency dependent weighting factor to each of the plurality of measured amplitudes to form a plurality of weighted measured amplitudes.

Suitably, the frequency dependent weighting factor is normalised.

Suitably, the combination of the plurality of weighted measured amplitudes is indicative of noise amplitude at the subset of the frequency range.

Suitably, the method comprises receiving the audio signal on each of a plurality of channels, further comprising measuring channel amplitude of the audio signal for each of the plurality of channels, wherein each measured channel amplitude is indicative of noise amplitude on that channel at the subset of the frequency range and wherein a weighted average of the measured channel amplitudes is indicative of noise amplitude at that subset of the frequency range.

Suitably, applying a frequency dependent weighting factor to each of the plurality of measured amplitudes comprises multiplying the frequency dependent weighting factor by the logarithmic of each of the plurality of measured amplitudes.

Suitably, fitting the predefined noise spectral shape to the noise amplitude comprises: comparing the noise amplitude and the predefined noise spectral shape in the subset of the frequency range; and fitting the predefined noise spectral shape in dependence on the comparison.

Suitably, the comparing step comprises determining the difference between the noise amplitude and a weighted average of the logarithmic amplitude of the predefined noise spectral shape.

Suitably, the method further comprises adapting at least one further predefined noise spectral shape by fitting to the noise amplitude so as to form at least one further estimated noise spectrum; and combining the estimated noise spectrum and the at least one further estimated noise spectrum so as to form a combined estimated noise spectrum.

Suitably, combining the estimated noise spectrum and the at least one further estimated noise spectrum comprises determining a weighted average of the estimated noise spectrum and at least one further estimated noise spectrum.

Suitably, the method further comprises adapting at least one further predefined noise spectral shape by fitting to the noise amplitude so as to form at least one further estimated noise spectrum; and combining the estimated noise spectrum and the at least one further estimated noise spectrum so as to form a combined estimated noise spectrum.

Suitably, combining the estimated noise spectrum and the at least one further estimated noise spectrum comprises determining a weighted average of the estimated noise spectrum and at least one further estimated noise spectrum.

Suitably, the method further comprises: determining the noise amplitude at the subset of the frequency range; and applying a median filter to the noise amplitude at the subset of the frequency range to form a median filtered noise amplitude; wherein the adapting step is performed using the median filtered noise amplitude.

Suitably the method further comprises: determining the noise amplitude at the subset of the frequency range; and applying a variable length median filter to the noise amplitude at the subset of the frequency range to form a variable length median filtered noise amplitude; wherein the adapting step is performed using the variable length median filtered noise amplitude.

Suitably the method further comprises prior to the measuring step storing the predefined noise spectral shape.

Suitably the method further comprises prior to the measuring step storing the predefined noise spectral shape and the at least one further predefined noise spectral shape.

Suitably the method further comprises prior to the measuring step storing the predefined noise spectral shape and the at least one further predefined noise spectral shape.

Suitably the method further comprises prior to the measuring step determining a subset of the frequency range at which to measure amplitude of the audio signal in dependence on the expected signal to noise ratio at the time of measuring at the subset of the frequency range.

Suitably the method further comprises suppressing noise in the audio signal to form a noise suppressed audio signal by using the estimated noise spectrum.

Suitably, the method further comprises: combining the noise suppressed audio signal with the audio signal to form a combined signal; and outputting the combined signal.

According to a second aspect of the invention, there is provided an apparatus for estimating the noise spectrum of an audio signal, the audio signal occupying a frequency range, the apparatus comprising: a measurement module configured to measure amplitude of the audio signal at only a subset of the frequency range, the subset having a low expected signal to noise ratio at the time of measuring such that the measured amplitude is indicative of noise amplitude at that subset of the frequency range; and an adapting module configured to adapt a predefined noise spectral shape by fitting to the noise amplitude so as to form the estimated noise spectrum.

Suitably, the apparatus further comprises: a noise determination module configured to determine the noise amplitude at the subset of the frequency range; and a median filter configured to filter the noise amplitude at the subset of the frequency range to form a median filtered noise amplitude; wherein the adapting module is configured to adapt the predefined noise spectral shape by fitting to the median filtered noise amplitude.

Suitably the apparatus further comprises: a noise determination module configured to determine the noise amplitude at the subset of the frequency range; and a variable length median filter configured to filter the noise amplitude at the subset of the frequency range to form a variable length median filtered noise amplitude; wherein the adapting module is configured to adapt the predefined noise spectral shape by fitting to the variable length median filtered noise amplitude.

Suitably, the measurement module is configured to measure channel amplitude of the audio signal on each of a plurality of channels; further comprising a mixing module configured to combine the measured channel amplitudes.

Suitably, the apparatus further comprises a noise suppression module configured to suppress noise in the audio signal to form a noise suppressed audio signal by using the estimated noise spectrum.

BRIEF DESCRIPTION OF THE DRAWINGS

The present invention will now be described by way of example with reference to the accompanying drawings. In the drawings:

FIG. 7 illustrates a suitable implementation of the fitting step 305 of FIG. 3;

DETAILED DESCRIPTION OF THE INVENTION

Figure 1:
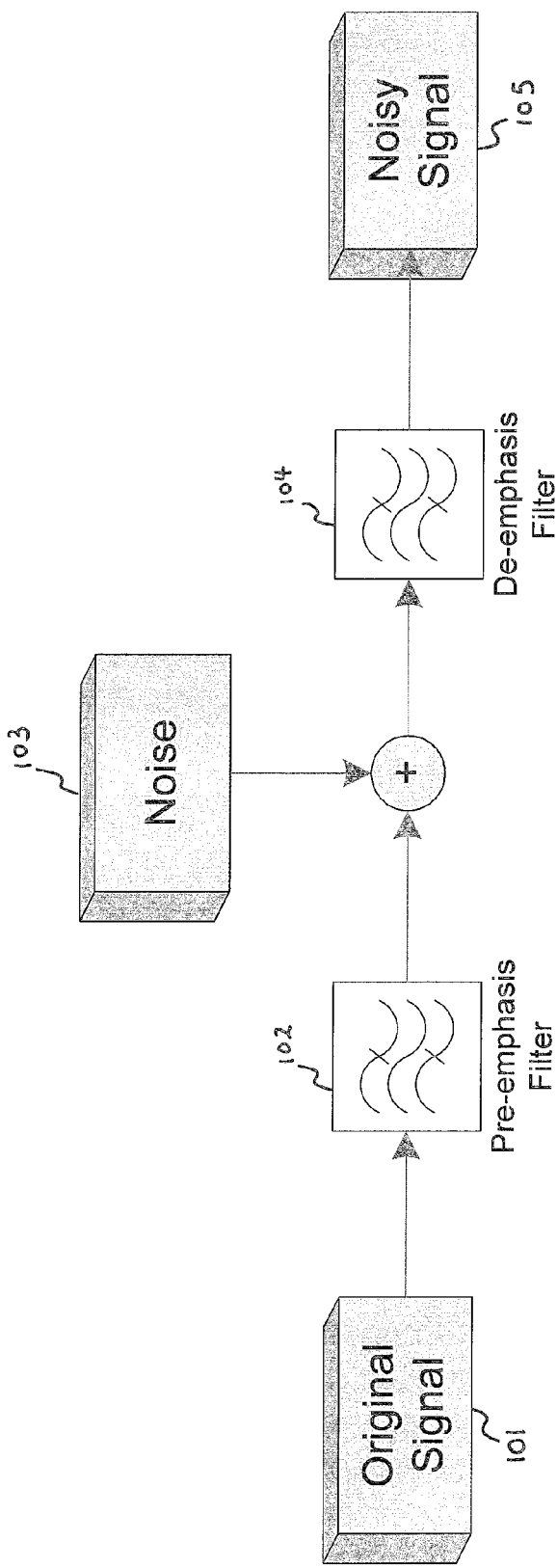
FIG. 1 illustrates a simplified model of a known FM transmission system.

The following example techniques are particularly applicable to a system which communicates using frequency modulated (FM) signals. FIG. 1 illustrates a simplified model of a known FM transmission system. In this simplified model, any change of the noise level or spectral shape of the signals caused by the modems is compensated for by the filters.

In FIG. 1, the signal to be transmitted 101 is first applied to a pre-emphasis filter 102 at the transmitting end of the communication channel. During transmission, the signal picks up noise. Consequently, the received signal comprises both wanted signal components and noise components. Suitably, the noise is assumed to be white noise 103. This white noise 103 is mainly due to poor FM signal reception. At the receiving end of the communication channel a de-emphasis filter 104 is provided. The received signal is applied to the de-emphasis filter 104. The de-emphasis filter 104 reverts the effect of the pre-emphasis filter 102.

In typical FM audio signals, the portion of the signal occupying high frequency bands has a relatively low energy compared to the portion of the signal occupying lower frequency bands. Typically, the higher the frequency the lower the energy of the audio content of the signal.

The discriminator, which is part of the FM demodulator at the receiving end of the communication channel, converts the noise power spectrum of the signal such that the converted noise power spectrum of the signal increases proportional to the square of the frequency.

The pre-emphasis filter 102 at the transmitting end of the communication channel amplifies the portion of the signal occupying higher frequency bands. The received signal is demodulated, and then applied to the de-emphasis filter 104. The de-emphasis filter 104 reduces the amplitude of the portion of the received signal occupying these higher frequency bands. Preferably the higher frequency bands are suppressed back to their original levels in signal 101.

The amplification of the signal applied by the pre-emphasis filter 102 is thereby removed by the de-emphasis filter 104. Both the wanted signal components and the noise components in the high frequency bands are suppressed. Therefore, the noise power spectrum of the signal (in addition to the wanted signal portion of the signal) is suppressed in the higher frequency bands by the action of the de-emphasis filter 104. This results in the noise spectrum of the received de-emphasised signal 105 having a low-pass characteristic compared to a noise spectrum measured directly in the communication channel.

The effect of the FM discriminator on the noise in the signal is therefore suppressed compared to the case if the pre-emphasis and de-emphasis filters had not been used. Consequently, lower levels of noise at higher frequencies result than would have been the case if the pre-emphasis and de-emphasis filters had not been used, therefore a higher signal to noise ratio (SNR) is achieved.

The use of pre-emphasis and de-emphasis filters is well known in FM radio transceivers. However, there are slight variations in the manner in which these filters are implemented in different products. Furthermore, other low-pass filters implemented in different parts of the demodulation process (e.g. stereo de-mixing) may have slightly different spectral shapes in different products. The consequence of these variations is that the exact spectral shape of the noise components in the received de-emphasised signal is dependent on product design.

Figure 2:
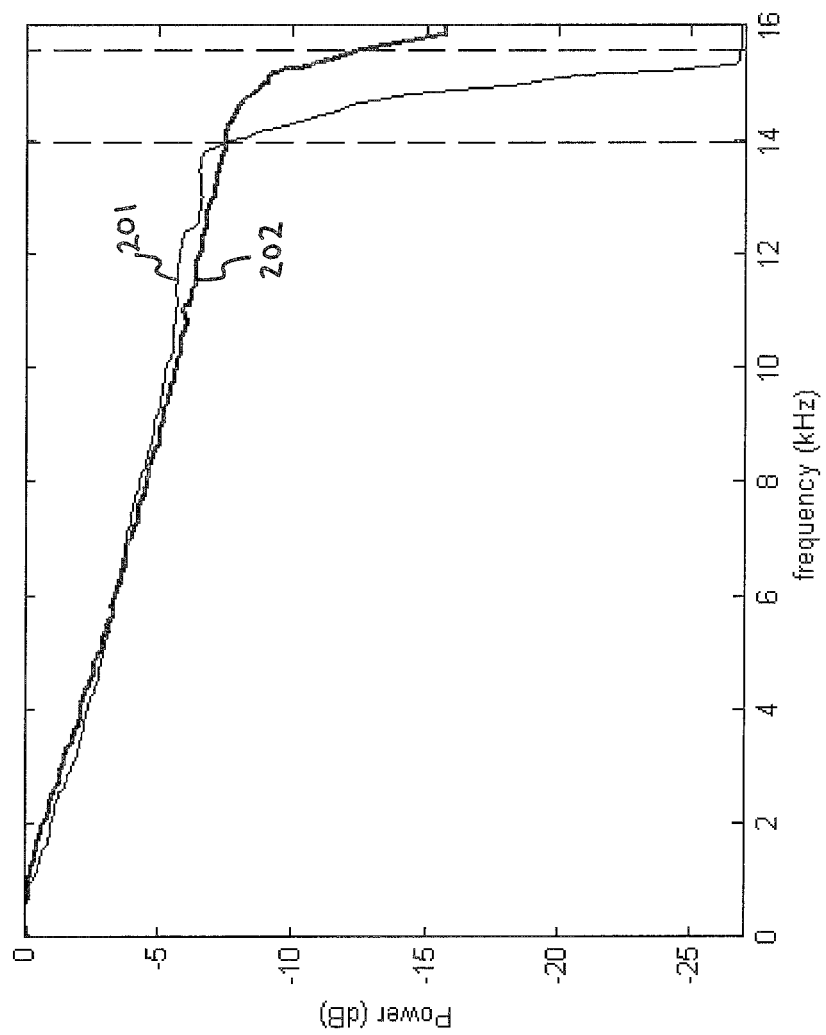
FIG. 2 illustrates measured noise spectra of two mobile phones.

FIG. 2 illustrates two noise spectra. Each noise spectrum is the power of the received de-emphasised signal as a function of frequency. These noise spectra have been normalised and averaged. The first, marked 201, is the noise spectrum of a received de-emphasised signal as measured in a first mobile phone. The second, marked 202, is the noise spectrum of a received de-emphasised signal as measured in a second mobile phone. The spectra are measured at similar noise levels.

The first and second spectra exhibit a similar general trend. In the first portion of each spectrum which encompasses the majority of the frequency range of the signal including low frequencies, the noise power gradually decreases as the frequency increases. In this first portion in both spectra, the noise power decreases generally linearly as the frequency increases. In both spectra, this first portion extends from low frequencies up to approximately 14 kHz. In the second portion of each spectrum encompassing the high frequency range of the signal, the noise power decreases quickly as the frequency increases. In this second portion in both spectra, the noise power decreases generally linearly as the frequency increases. In both spectra, this second portion extends from approximately 14 kHz to the high end of the frequency range. The gradient of each spectrum in the second portion is significantly steeper than the gradient of each spectrum in the first portion. In other words, the noise spectra each exhibit a low-pass characteristic. This low-pass characteristic results from the pre-emphasis and de-emphasis filters as described above.

The wanted signal component of the received de-emphasised signal (i.e. the audio content) has low energy, is infrequent and short-lived in high frequency bands. In these high frequency bands the received signal can therefore be assumed, for the purposes of the method disclosed herein, to consist primarily of noise.

The spectral shapes of noise spectra are known. These spectral shapes have been empirically determined and may depend on various parameters such as the environment that the receiver operates in, the particular implementation of the receiver, etc. For example, the spectral shape of the noise that results from additive white noise in FM transmission systems has been well defined empirically, as explained earlier. Furthermore, the receiver may appear to operate in various states depending on the level of noise or other externally controlled parameters. For example in the case of FM audio transmission, at very low levels of input noise, the main contributor of noise may become quantisation noise, thermal noise or other internal imperfections in the receiver. On the other hand at higher levels of input noise, the shape of the noise spectrum may change to accommodate the changes in the noise characteristics (e.g. threshold effect, etc.).

The spectral shape of a noise spectrum is the profile of the power of the noise distribution as a function of frequency.

By determining the noise in a subset of the frequency range of a signal by measurement of the signal, the method described herein advantageously uses the known spectral shape of the noise in the signal and the known rules governing the state machine of the system to estimate the noise spectrum across the whole frequency range of the signal.

Figure 3:
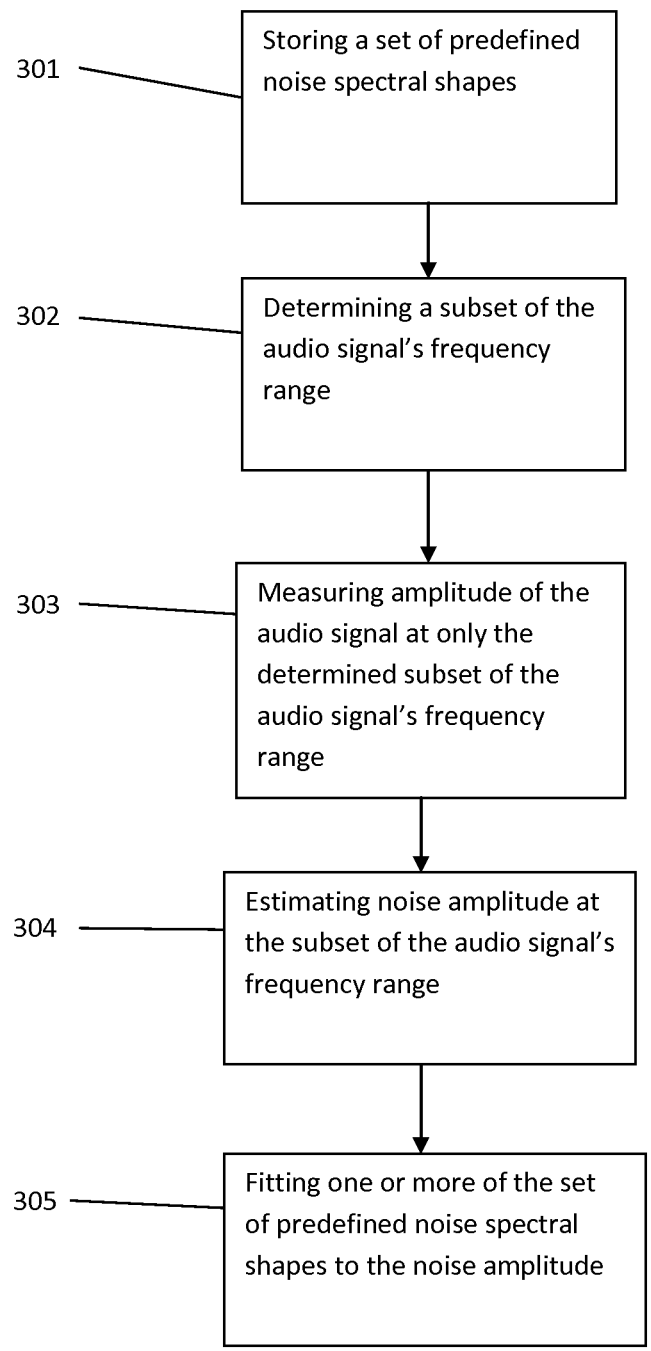
FIG. 3 illustrates a suitable method for estimating the noise spectrum of an audio signal.

FIG. 3 illustrates a suitable method for estimating the noise spectrum of an audio signal. The audio signal occupies a frequency range. The steps of FIG. 3 are performed at the receiving end of the communication. The receiving end of the communication may, for example, be a transceiver in a user apparatus. At step 301 a set of predefined noise spectral shapes is stored. Preferably, the noise spectral shapes stored depend on the different states of operation of the system. These different states of operation may depend on the noise level or may be specified by the user. For example, additive white noise may be considered to dominate the noise picked up during transmission. In this case, the noise shapes stored will be that of the signal which result from passing white noise through the system. At lower input noise levels, the noise resulting from passing white noise through the system may no longer dominate the noise. Instead, one or more other types of noise in the system may provide a larger contribution to the noise. Examples of other types of noise are computational/quantisation noise and thermal noise. Alternatively, the spectral shape of the noise may change due to a user-triggered change in the system. For example in a multi-radio device the user may start transmitting on another frequency which may have known effects on the spectral shape of the noise in the received signal. Suitably, the noise spectral shapes of the set of predefined noise spectral shapes are determined dependent on the receiver and its modes of operation and stored on the receiver, for example at manufacture. Alternatively, the noise spectral shapes may be dynamically stored at the receiver during operation of the receiver.

A plurality of predefined noise spectral shapes may be stored at the receiver. A particular one or a subset of the predefined noise spectral shapes may be implemented in the method. These may be implemented, for example, depending on the environmental conditions. The method may include an additional step of determining the types of noise expected to dominate the noise interference in the signal, and implementing the corresponding noise spectral shape or shapes in the method. Alternatively, or additionally, a particular one or set of predefined noise spectral shapes may be implemented in the method depending on the type of signal transmission. Examples of different types of signal transmission include FM and AM signals. The method may include an additional step of determining the type of signal being communicated, and implementing the corresponding one or subset of noise spectral shapes for that type of signal.

At step 302 of FIG. 3, a subset of the audio signal's frequency range is determined. This subset is one or more frequency bands in which the signal is considered to consist primarily of noise. This subset may be determined in advance of reception of the signal at the receiver based on the expected properties of the signal. For example, in the above discussion the subset is a high frequency band chosen in advance of reception of the signal based on the expected property of the signal having a low signal to noise ratio in that frequency band. The subset may be determined independent of the particular receiver and stored on the receiver, for example at manufacture.

Alternatively, the subset may be determined dynamically by the receiver. Suitably, this determination by the receiver is in dependence on measured properties of the received signal. For example, the receiver may scan the frequency range of the signal to identify frequency bands with low signal to noise ratios or with no wanted signal component. The subset of the frequency range of the signal is determined to include these frequency bands. The receiver may be configured to track these particular frequency bands on a frame-by-frame basis. In this case, the receiver expects the signal to noise ratio of these frequency bands to be low because it has measured them to be low in a frame close to or the same as the one for which the noise spectrum is being estimated.

Alternatively, the receiver may determine that the subset of the frequency range includes both predetermined frequency bands and dynamically determined frequency bands. For example, the receiver may select a high frequency band to be comprised in the subset of the frequency range on the basis that the audio content in the high frequency band is expected to be low. In addition, the receiver may determine other frequency bands to be comprised in the subset of the frequency range on the basis that the audio content in these frequency bands is measured to be low in a frame close to or the same as the one for which the noise spectrum is being estimated.

In any case, the subset of the frequency range is selected on the basis that it is expected to have a low signal to noise ratio at the time at which the measurement of step 303 takes place.

At step 303, amplitude of the audio signal is measured only at the determined subset of the audio signal's frequency range. At step 304, noise amplitude at the subset of the audio signal's frequency range is estimated. At step 305, one or more of the set of predefined noise spectral shapes is adapted by fitting to the estimated noise amplitude at the subset of the audio signal's frequency range.

In the case of a modulated audio signal, for example a FM audio signal, the signal is demodulated prior to the measuring step 303 of FIG. 3. The measuring step 303 of FIG. 3 is consequently performed on the demodulated audio signal.

FIG. 2 illustrates an empirical determination of the subset of the frequency range for the noise spectrum marked 202. The subset of the frequency range is selected to be the high frequency band 13.96 kHz to 15.56 kHz. This frequency band is marked by vertical dashed lines on FIG. 2. In this example, the determination of the subset of the frequency range is suitably determined at manufacture in dependence on the known noise spectral shape for that product design.

Figure 4:
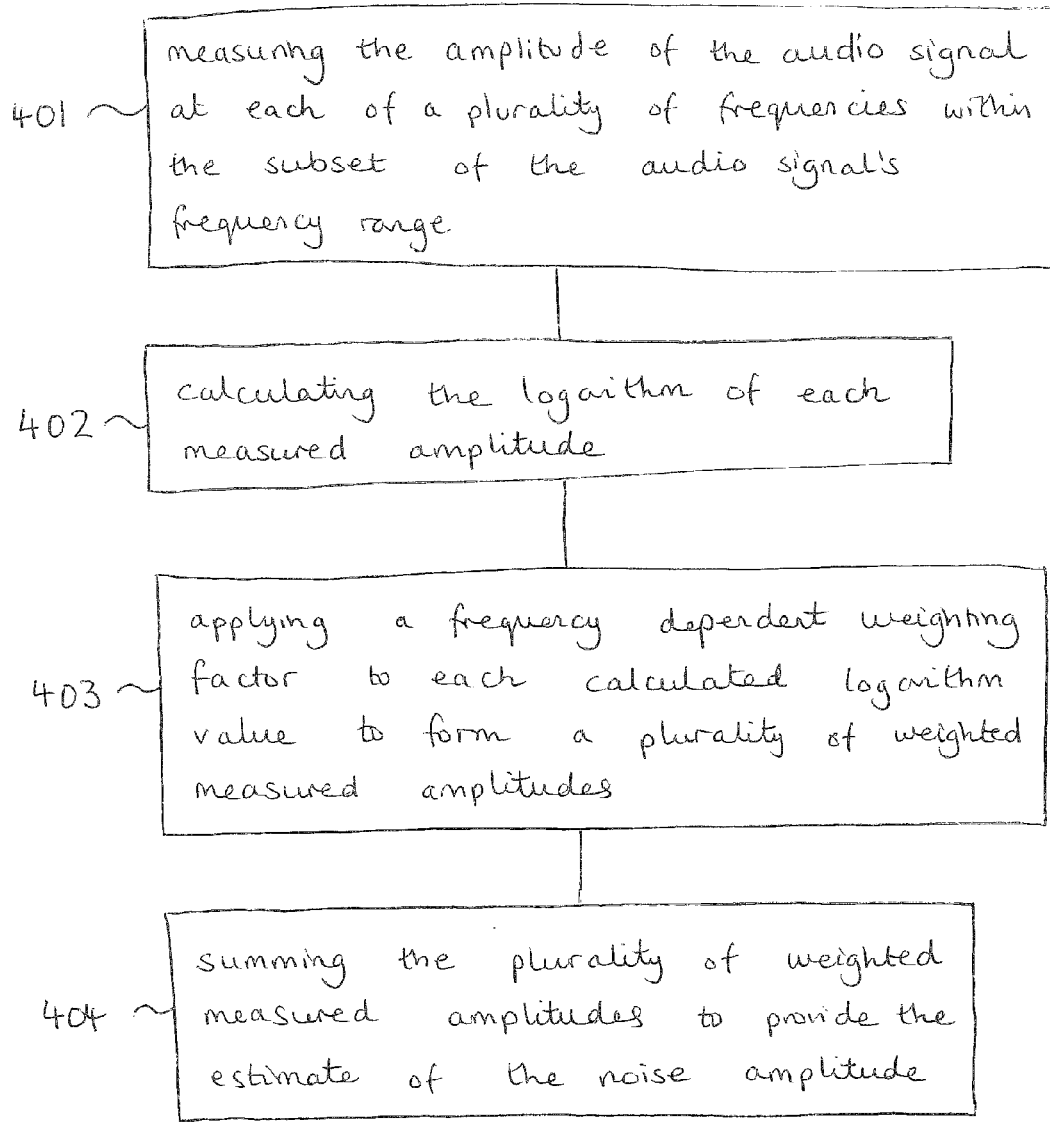
FIG. 4 illustrates a suitable implementation of steps 303 and 304 of FIG. 3.

FIG. 4 illustrates a suitable implementation of steps 303 and 304 of FIG. 3. In FIG. 4, noise amplitude at the subset of the audio signal's frequency range is determined according to the equation:

$$E(n) = \sum_{f=f_1}^{f_2} W_n(f) \log(X_n(f)) \qquad \text{(equation 1)}$$

where $X_n(f)$ is the short-time spectral amplitude of the audio signal at frequency bin f and frame number n; $W_n(f)$ is a weighting factor applied to the frequency bin f at frame n; $f_1$ is the lower frequency limit of the subset; $f_2$ is the upper frequency limit of the subset; and E(n) is the noise amplitude at frame number n.

At step 401 amplitude of the audio signal within the subset of the audio signal's frequency range is measured by measuring the amplitude of the audio signal $X_n(f)$ at each of a plurality of frequencies within the subset of the audio signal's frequency range. These frequencies span $f_1$ to $f_2$ in equation 1. Each signal amplitude measurement is at a different frequency in the subset.

At step 402 the logarithm of each of the plurality of measured amplitudes $X_n(f)$ is calculated. At step 403, a frequency dependent weighting factor $W_n(f)$ is applied to each value calculated at step 403 to form a plurality of weighted measured amplitudes. At step 404, the plurality of weighted measured amplitudes are summed to provide an estimate of the noise amplitude E(n).

The subset of the frequency range is selected because in this subset the signal has a low expected signal to noise ratio at the time of measuring the amplitude. Consequently in this subset amplitude of the signal is indicative of amplitude of the noise components in the signal. Experiments have shown that equation 1, which is a weighted average of the logarithmic-signal amplitude spectrum over the subset of the frequency range, is a suitable measure of noise amplitude in the signal over the subset of the frequency range.

The use of the weighting factor $W_n(f)$ in equation 1 allows the noise level at the subset of the frequency range to be determined more reliably. The specific form of the weighting factor depends on the configuration of the receiver. For example, the weighting factor may depend on the energy of the signal at each of the plurality of frequencies. In an FM transmission system as shown in FIG. 1, the de-emphasis filter 104 highly suppresses frequencies above a certain frequency. For example, this frequency may be 15 kHz. This means that the noise content (in addition to the signal content) of the higher frequencies is low in such a system. A weighting factor which applies a higher weight to lower frequencies in the subset of the frequency band is used in this case.

Figure 5:
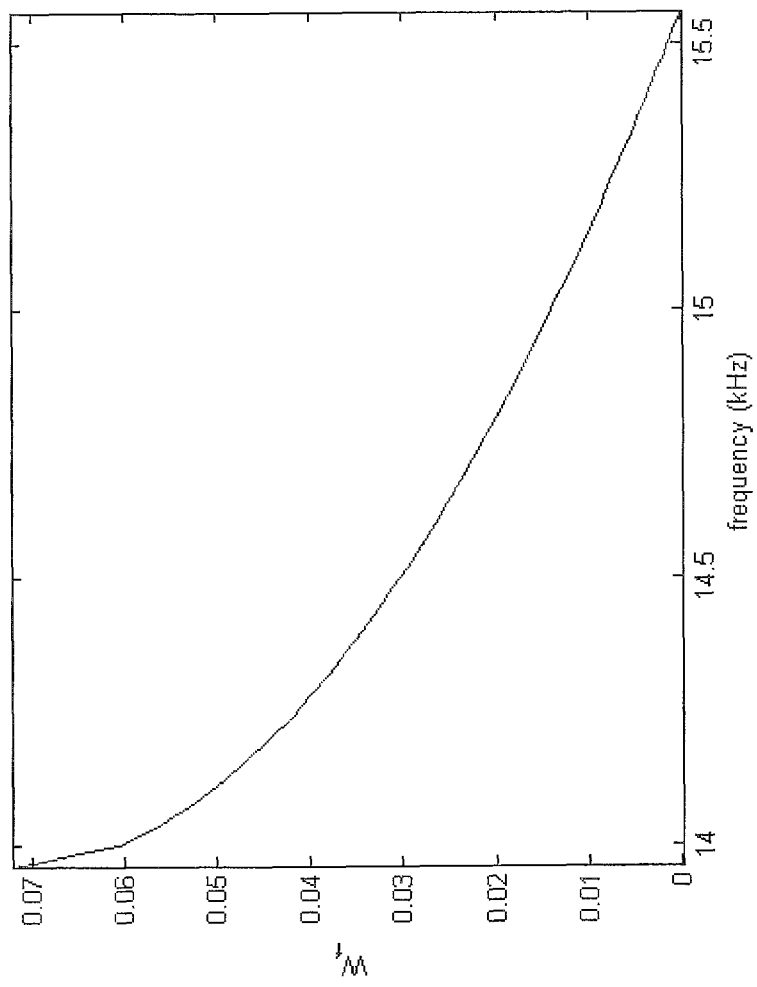
FIG. 5 illustrates a graph of a frequency dependent weighting factor.

FIG. 5 illustrates a graph of a suitable frequency dependent weighting factor $W_n(f)$ for use in the FM transmission system of the second marked noise spectrum 202 of FIG. 2. The weighting factor decreases as the frequency increases to account for the suppression of the high frequency components of the signal due to the de-emphasis filter.

In systems which do not use a de-emphasis filter, the weighting factor takes a different form. For example, in one system the suppression of the high frequency band may be implemented in the digital signal processor (DSP) rather than in the RF front end using a de-emphasis filter. In this case, the DSP is able to estimate the noise energy in the high frequency band which has a very low signal to noise ratio. In this frequency band, the signal components are substantially wholly noise components which result from FM radio standard specifications. There is substantially no wanted signal in this frequency band. In this case, the weighting factor has a different profile to that shown in FIG. 5. Namely, the weighting factor increases with increasing frequency. This is to reflect the fact that the signal to noise ratio increases with increasing frequency over the subset of the frequency range.

The weighting factor may also depend on the configuration of the hardware of the receiver. For example, the weighting factor may be configured to account for noise left in the signal as a result of demodulation and/or filtering.

The weighting factors may also depend on the signal-to-noise ratio in individual frequency bins. In this sense the weighting factors will vary with time. Smoothing functions can be used to determine and track the level of contribution of each band depending on the level of noise in that band.

The weighting factor is normalised. In other words, the weighting factor summed over the frequencies in the subset of the frequency range is equal to 1. Mathematically:

$$\sum_{f=f_1}^{f_2} W_f = 1 \quad \text{(equation 2)}$$

The accuracy of the noise energy estimate can be further improved in the case that the signal is transmitted in stereo. Generally, in cases where two or more audio channels are available and it can be reasonably assumed that the noise level is the same in all channels, the energy levels (noise amplitudes) obtained using equation 1 can be combined to give a more accurate estimate. The average of the estimates will be the optimal estimate if the estimation error is the same for all of the estimates. If the accuracy of each estimate is known then a weighted average of the individual channel estimates can be determined according to the following equation:

$$E'(n) = \frac{\sum_{i=1}^{K} v_i(n) E_i(n)}{\sum_{i=1}^{K} v_i(n)} \quad \text{(equation 3)}$$

where $E'(n)$ is the estimated noise amplitude calculated for all channels at frame number n; K is the number of channels; $E_i(n)$ is the energy calculated for channel i; n is the frame number; and $v_i(n)$ is the weight given to the noise energy calculated for channel i. The weight $v_i(n)$ can be considered to be the degree of accuracy of the estimate.

Equation 3 specifies that the estimated noise energy calculated for all channels $E'(n)$ is equal to the sum over all K channels of the product of the weight and energy calculated for each channel, divided by the sum over all K channels of the weight of each channel.

The weight $v_i(n)$ is inversely related to the signal-to-noise ratio of the frequency band:

$$v_i(n) = \frac{1}{\gamma_i(n)} \quad \text{(equation 4)}$$

where $\gamma_i(n)$ is the average SNR of channel i in frame n, across the frequency band for which noise amplitude is estimated according to equation 1.

The higher the signal-to-noise ratio in a channel, the less accurate the noise estimate.

Using equation 4, equation 3 can be re-written as:

$$E'(n) = \frac{\sum_{i=1}^{K} \left( \prod_{\substack{j=1 \\ j \neq i}}^{j=K} \gamma_j(n) \right) E_i(n)}{\sum_{i=1}^{K} \left( \prod_{\substack{j=1 \\ j \neq i}}^{j=K} \gamma_j(n) \right)} \quad \text{(equation 5)}$$

For the two-channel (i.e. stereo) case equation 5 can be re-written in a simplified form:

$$E'(n) = \frac{\gamma_2(n) E_1(n) + \gamma_1(n) E_2(n)}{\gamma_1(n) + \gamma_2(n)} \quad \text{(equation 6)}$$

The value of $\gamma_i(n)$ is suitably estimated using an algorithm which uses past values of the average SNR of the channel as reliable estimates. Such algorithms are known in the art.

Suitably, the improved estimate of the noise amplitude $E'(n)$ is used instead of the estimate of the noise amplitude $E(n)$ in the remainder of the description, namely in equations 7, 8, 9 and the accompanying text.

Figure 6A:
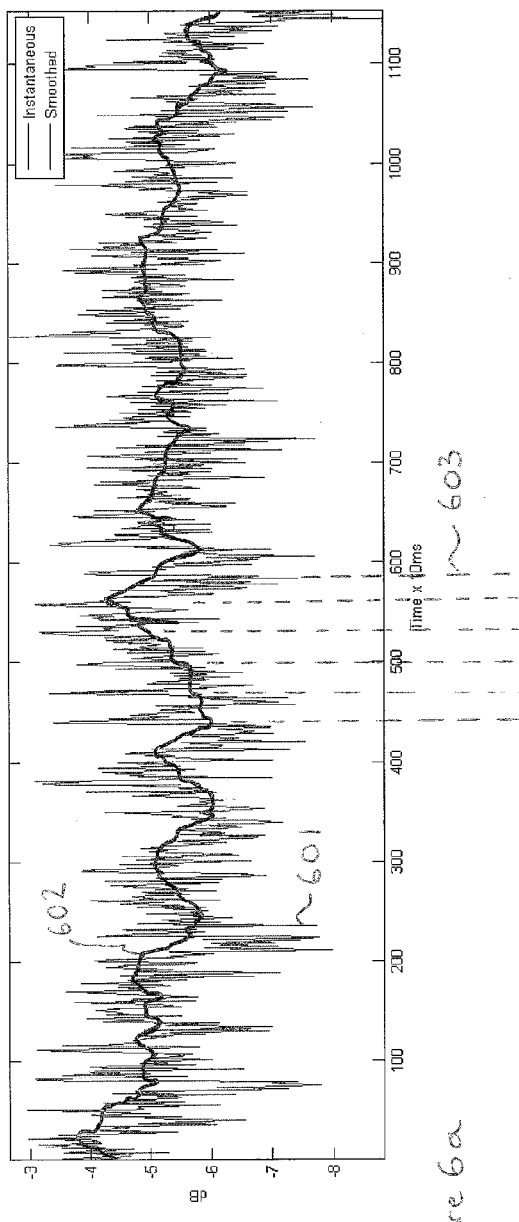
FIG. 6 illustrates the calculated noise amplitude plotted against time.

FIG. 6a is a graph of the instantaneous noise amplitude, $E(n)$, plotted against time for a sample FM recorded music signal. The graph shows the noise amplitude to be highly fluctuating with time (see line 601).

The fitting step 305 of FIG. 3 is preferably performed by comparing the noise amplitude and one or more of the stored predefined noise spectral shapes in the subset of the frequency range. For the purpose of this comparison, the predefined noise spectral shape is treated as set at a reference power level. In dependence on this comparison, each predefined noise spectral shape is multiplied by a factor. The result of this multiplication is the estimated noise spectrum for that predefined noise spectral shape.

FIG. 7 illustrates a suitable implementation of the fitting step 305 of FIG. 3 when steps 303 and 304 of FIG. 3 have been implemented according to the method of FIG. 4. In FIG. 7, each predefined noise spectral shape is adapted by fitting it to the noise amplitude so as to form an estimated noise spectrum determined according to the equation:

$$N_n(f) = 10^{log(T(f)) - \sum_{f=f_1}^{f_2} W(f) log(T(f)) + E(n)} \quad \text{(equation 7)}$$

where $N_n(f)$ is the estimated noise amplitude at frequency bin f and frame number n for the predefined noise spectral shape; T(f) is the predefined noise spectral shape; and the remaining terms are as defined with respect to equation 1.

As mentioned above, the predefined noise spectral shape T(f) is treated as set at a reference power level. In step 701, the logarithm of each of a plurality of amplitudes of the predefined noise spectral shape within the subset of the audio signal's frequency range is calculated. In step 702, a frequency dependent weighting factor W(f) is applied to each of the log values calculated in step 701. This frequency dependent weighting factor is the same frequency dependent weighting factor that is applied to the plurality of measured amplitudes in FIG. 4. A weighted average of the log amplitude of the predefined noise spectral shape is formed by summing together the plurality of weighted log values. If the weighting factors are constant over time, then the weighted average of the log amplitude of the predefined noise spectral shape is suitably calculated once and stored for that predefined noise spectral shape.

In step 703, the difference between the noise amplitude, E(n), and the weighted average of the log amplitude of the predefined noise spectral shape is determined. The estimated noise spectrum is then determined by fitting the predefined noise spectral shape in dependence on this determined difference. In step 704 of FIG. 7, the estimated noise at a particular frequency is determined as $10^x$, where x is the logarithm of the predefined noise spectral shape at that particular frequency minus the determined difference.

The methods discussed in relation to FIGS. 4 and 7 are all carried out in the logarithmic domain. There are two associated advantages of performing calculations in the logarithmic domain. Firstly, segmentation of the signal into frames often results in sporadic peaks in the frequency domain. Calculating averages in the logarithmic domain limits the perturbing effect of such sporadic peaks. Secondly, the range of values calculated in the logarithmic domain is expected to be within the limits of what is suitable for DSP implementations. This is because the use of the logarithmic domain reduces calculations which would otherwise require multiplication to calculations which can be completed using addition.

Part or all of the methods discussed in relation to FIGS. 4 and 7 may alternatively be carried out in the linear domain (as opposed to the logarithmic domain). For example, equation 7 may be re-written as the predefined noise spectral shape T(f) multiplied by a factor, c, as follows:

$$N_n(f) = cT(f) \quad \text{(equation 8)}$$

$$c = 10^{E(n) - \sum_{f=f_1}^{f_2} W_n(f) log(T(f))}$$

Using this formulation, step 704 in FIG. 7 is replaced by two steps. Firstly, a factor c is determined as being 10 to the power of the determined difference (the determined difference being that determined in step 703 of FIG. 7). Secondly, the predefined noise spectral shape, T(f), is multiplied by the factor, c. The result of this multiplication is the estimated noise spectrum.

Experiments have shown that the shape of the noise spectrum may change at different noise levels. For example the spectrum may become flatter when the noise level is low and steeper when the noise level is high. The reason for this behaviour is that the dominant source of the noise changes. For example, the dominant source of noise may change from RF (radio frequency) noise at higher noise levels, which is white to begin with and is shaped by the demodulator and the de-emphasis filter, to quantisation noise and computational noise at lower noise levels. Suitably, more than one of the set of stored predefined noise spectral shapes is fitted to the noise amplitude. A weighted average of these fitted noise spectral shapes is then used in order to account for the changing shape of the noise spectrum at different noise levels. The weighted average of the fitted noise spectral shapes may be written as follows:

$$N_n'(f) = \sum_{i=1}^{P} w(i, E(n)) N_{n,i}(f) \quad \text{(Equation 9)}$$

where $N_{n,i}(f)$ is the estimated noise amplitude at frequency bin f and frame number n calculated according to equation 7 based on the $i^{th}$ noise shape; w(i, E(n)) is the weighting applied for the $i^{th}$ noise shape; and P is the number of noise shapes incorporated in the estimate. The weights for each noise shape can be set empirically to vary with the noise level.

The noise amplitude E(n) in FIG. 6a fluctuates highly with time (see line 601). These fluctuations are a result of short-time windowing and the random distribution of content in the frequency domain.

Figure 6B:
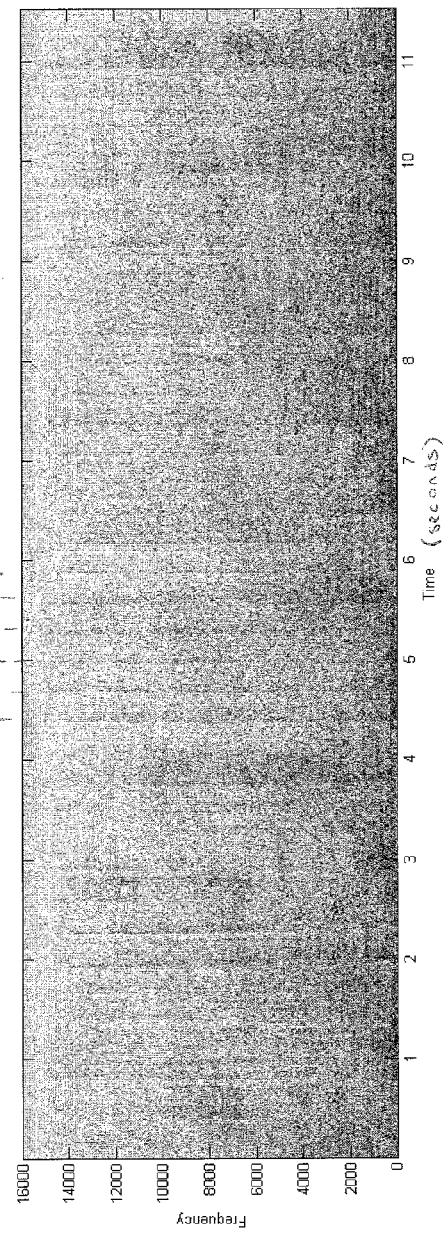

FIG. 6b is a spectrogram of the sample FM recorded music signal which was used to produce the noise amplitude, E(n), of FIG. 6a. The spectrogram shows that some high frequency wanted signal components of the received signal have leaked into the determination of the noise amplitude, E(n). In this particular case, drum beats visible as vertical lines in the spectrogram have translated into large peaks in E(n). Vertical dashed lines 603 extending between FIG. 6a and FIG. 6b illustrate some drum beats in the spectrogram in the region between 4 and 6 seconds and the corresponding peaks in the graph of E(n).

The leaking of the wanted signal into the noise amplitude is not overcome by using more complex averaging techniques, for example lossy averaging or a moving average. This is because instead of the peaks these averaging techniques result in suppressed tails across the spectrum.

Preferably, the noise amplitude at the subset of the frequency range is filtered by a median filter to form a median filtered noise amplitude. The median filter acts to smooth the fluctuations in E(n) in addition to avoiding the peaks caused by leakage of the wanted signal into the noise amplitude estimate. Line 602 on FIG. 6a is the noise amplitude E(n) following the application of a median filter. In the particular case of FIG. 6a, this median filter is of size 40 (i.e. 400 ms). The median filter can be seen to smooth E(n) and also to distinguish between the short-lived high frequency wanted signal components and the high frequency noise components in the signal so as to remove the wanted signal components from the noise amplitude estimate.

Figure 8:
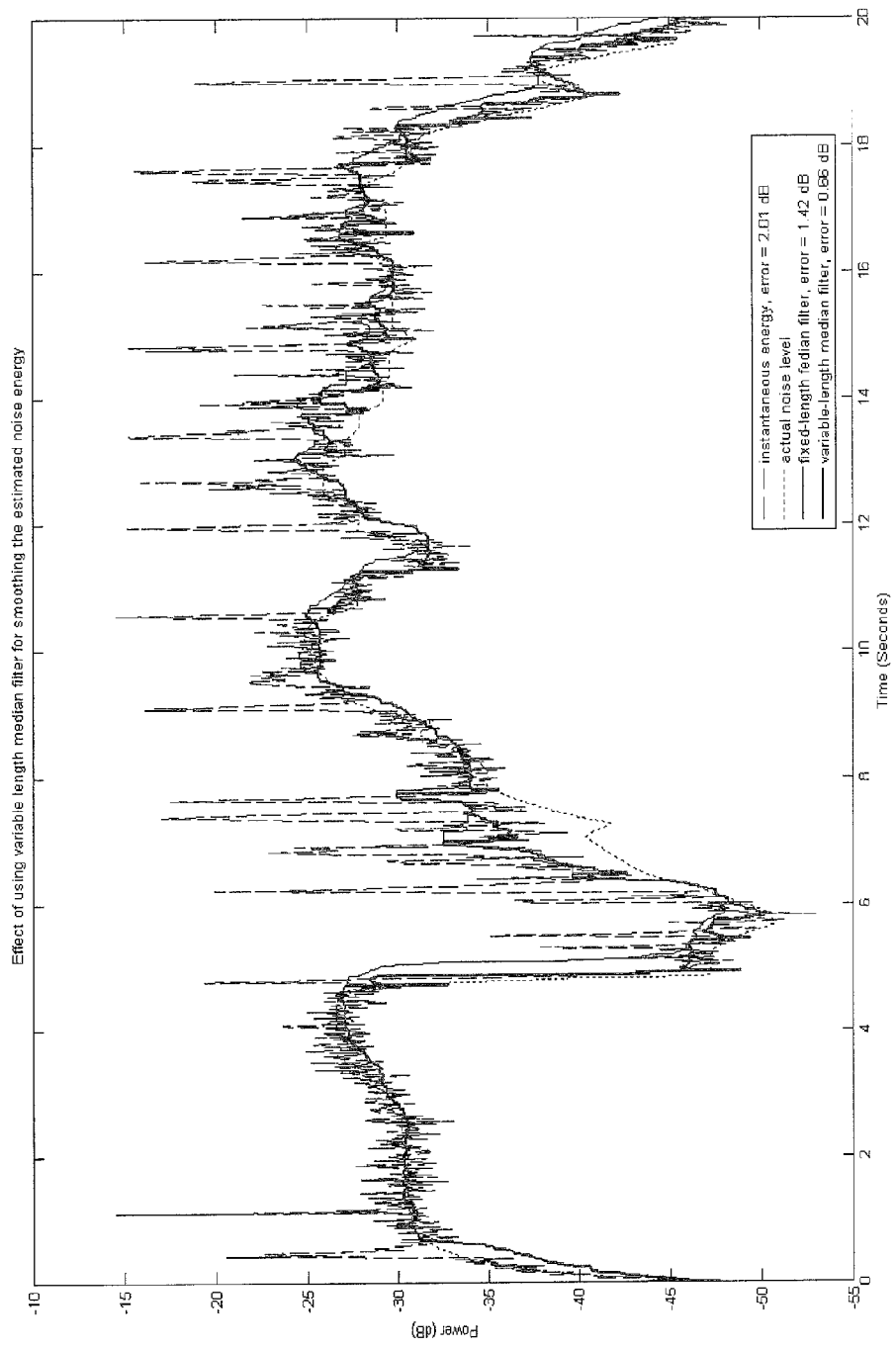
FIG. 8 illustrates calculated noise amplitude plotted against time using different levels of filtering.

Optionally, rule-based logic is added to the above method for improved estimation of the noise amplitude. The application of a median filter, as explained above, helps in distinguishing between transient large peaks, assumed to originate from the wanted signal, and the actual noise amplitude. If such a method is not used then in addition to the noise amplitude estimate fluctuating, the noise amplitude estimate will be over-estimated. This over-estimation will result in suppression of the wanted signal, which in turn, results in very noticeable distortions in the processed signal. In particular, since the median filter has an average delay equivalent to half its length it is slow to adapt to variations in the noise level. In particular, the over-estimation will carry on for a delay equivalent to half the length of the median filter after the level of noise has dropped. This effect is shown in FIG. 8, where a sudden drop in noise level occurred at about 5 seconds into the signal.

Figure 9:
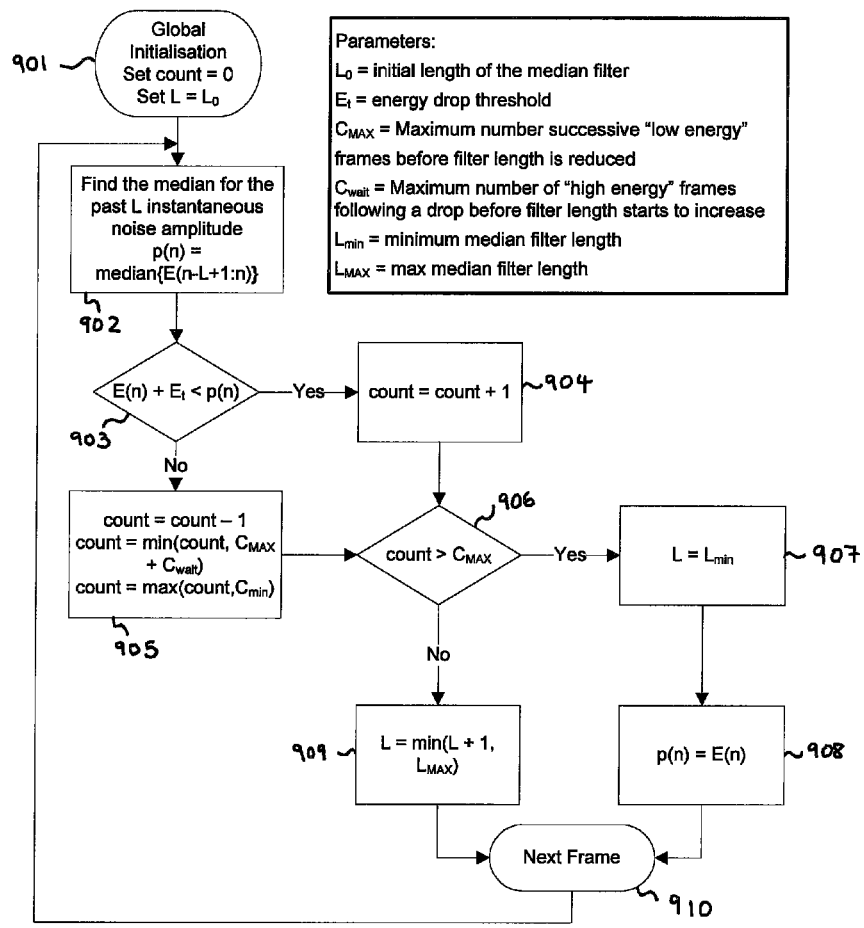
FIG. 9 illustrates a method of rule-based variable-length median filter for smoothing the calculated noise amplitude.

In order to mitigate this effect, a variable length median filter is preferably used which uses rule based logic to determine the length of the median filter. This method is shown in the flowchart of FIG. 9. At step 902, the median p(n) of the past L instantaneous noise amplitudes E(n) is determined. At step 903, the instantaneous noise amplitude calculated in equation 1 E(n) is compared against the output of the median filter, p(n). If the latter is greater than the instantaneous value plus an adjustable threshold, $E_t$, a counter, count, is incremented at step 904. This counter counts the number of successive "low noise energy" frames. If at step 903 the instantaneous energy is not below the given threshold E(t), the value of the counter is decremented at step 905. In this case the value of the counter is clipped to remain in a given range, for example $[C_{min}, C_{MAX}+C_{wait}]$. Larger values of $C_{min}$ decrease the response time in the event of a sudden drop in noise level. $C_{MAX}$ is the number of successive "low noise energy" frames before the length of the median filter is decreased. At step 906 if the value of count is greater than $C_{MAX}$, the variable length median filter enters a new state at step 907 in which the length of the median filter is dropped to $L_{min}$. In this state instantaneous noise energy calculated in equation 1 is used in the following calculations (e.g. equation 7). $C_{wait}$ is the number of frames to stay or wait in this new state following a period of "low noise energy" frames. This is to safeguard the method from jumping between states before a stable condition is reached. If at step 906 the value of count is less than or the same as $C_{MAX}$ then the variable length median filter enters a new state at step 909 in which the length of the median filter is the smaller of the initial length of the median filter plus 1 (L+1) and the maximum length of the median filter ($L_{MAX}$).

Figure 10:
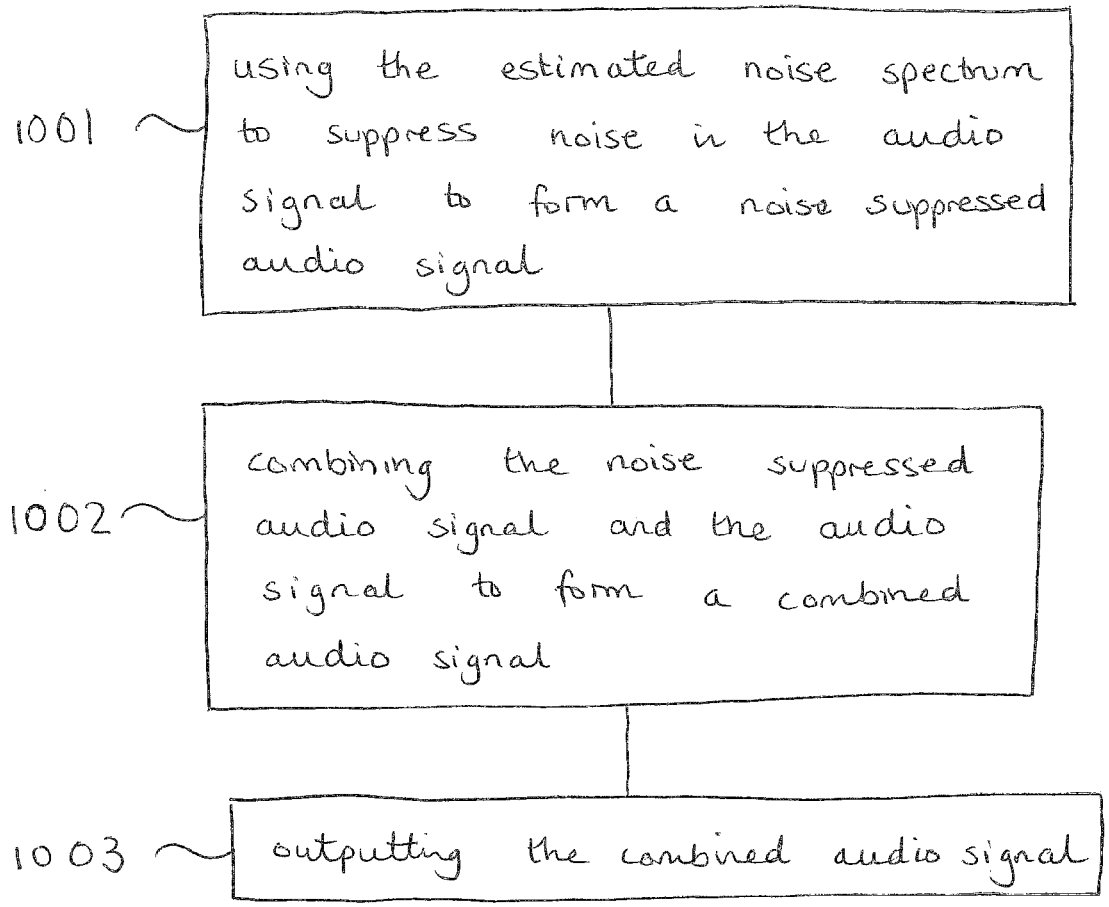
FIG. 10 illustrates a method for enhancing an audio signal using noise suppression.
Figure 11:
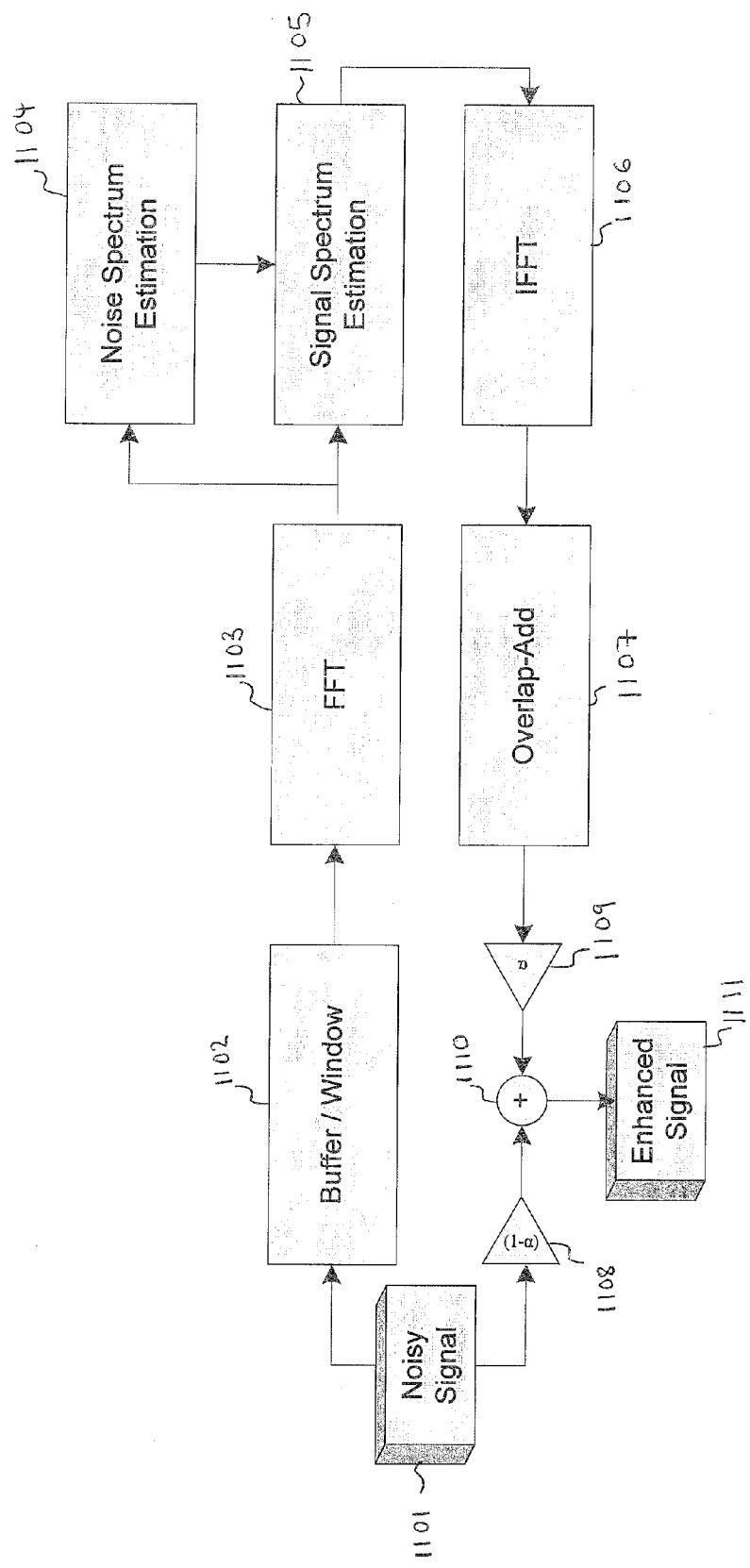
FIG. 11 illustrates an apparatus for enhancing an audio signal using noise suppression.

The estimated noise spectrum is suitable for use in a number of applications. Suitably, the estimated noise spectrum is used in a noise suppression method in order to improve the quality of the received signal. FIGS. 10 and 11 illustrate a method and apparatus respectively for enhancing an audio signal using a noise suppression method. The received signal comprising wanted signal components and noise components is input to the apparatus at block 1101. The signal is outputted to a buffer 1102. Following a fast fourier transform (FFT) at block 1103, the noise spectrum of the received signal is estimated at block 1104 and the wanted signal spectrum is estimated at block 1105.

Preferably, the noise spectrum is estimated by the noise spectrum estimation block 1104 in accordance with the method described herein. More specifically, a measurement module of noise spectrum estimation block 1104 is used to measure amplitude of the audio signal at the subset of the audio signal's frequency range (for each channel in the case of multiple channels); a noise determination module of noise spectrum estimation block 1104 is used to determine the noise amplitude at the subset of the frequency range (for each channel in the case of multiple channels); a mixing module of noise spectrum estimation block 1104 is used to combine all the noise amplitude estimates for all the channels in the case of multiple channels; a median filter (preferably variable length median filter) of noise spectrum estimation block 1104 is used to filter the noise amplitude outputted from the noise determination module; and an adapting module of noise spectrum estimation block 1104 is used to fit one or more of a set of predefined noise spectral shapes to the filtered noise amplitude so as to form the estimated noise spectrum. The estimated noise spectrum is inputted to the signal spectrum estimation block 1105.

Preferably, the wanted signal spectrum is estimated by suppressing the estimated noise spectrum determined in block 1104 from the original audio signal at a noise suppression module. This is step 1001 in FIG. 10. An inverse fast Fourier transform (IFFT) is carried out on the estimated wanted signal spectrum. An overlap-add function is then applied to the signal at block 1107 to smooth fluctuations at the frame boundaries. The processed signal output from block 1107 is mixed with the original audio signal at mixer 1110. This is step 1002 in FIG. 10. The mix ratio of the processed signal and the original signal may optionally be adjusted at blocks 1108 and 1109. The resulting combined signal is output from the apparatus at step 1003.

The method of FIG. 10 and the apparatus of FIG. 11 mix the noise suppressed signal with the original noisy signal so as to hide distortions introduced into the noise suppressed signal by the processing described and to preserve the naturalness of the output.

FIG. 11 is a simplified schematic diagram in which delay considerations and other standard functionality are not expressly shown. The method described does not have to be implemented at the dedicated blocks depicted in FIG. 11. The functionality of each block could be carried out by another one of the blocks described or using other apparatus. For example, the method described herein could be implemented partially or entirely in software.

The method described herein uses the energy determined in only part of the frequency range of the audio signal to estimate the noise level in that part of the frequency range, and further to estimate the noise spectrum of the whole of the frequency range of the audio signal. One or more of a set of predefined noise spectral shapes for the particular noise types in the signal is used in order to estimate the whole of the noise spectrum using noise estimates of only part of the spectrum. The resulting higher quality output is particularly desirable for audio signals comprising music.

The method described herein is a continuous noise spectrum estimation method. This is particularly advantageous for mobile applications where the noise level is changing frequently and quickly due to constant movement of the antenna. The continual estimation enables the method described herein to adapt quickly to changes in the noise level. This fast convergence in tracking the noise level increases the performance of a noise suppression method using this noise estimation method. Conversely, the voice activity detector (VAD) methods and minimum statistics methods are not able to track the changes in the noise level as quickly as the continuous method described herein.

The method described herein does not use a voice activity detector (VAD). The method described herein is less computationally complex than methods employing a VAD or methods that use minimum statistics to track the noise in a signal. The low computational complexity is particularly advantageous for use on apparatus where low power, low MIPS (million instructions per second) is desirable, for example in mobile applications.

The method proposed herein may be used with any suitable noise suppression method. Suitable noise suppression methods include use of a weiner filter, a frequency domain Kalman filter, or a LSA MMSE (log spectral amplitude mean minimum squares estimation).

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of estimating the noise spectrum of an audio signal, the audio signal occupying a frequency range, the method comprising:
    determining a subset of the frequency range at which to measure amplitude of the audio signal in dependence on the expected signal to noise ratio at the time of measuring at the subset of the frequency range;
    measuring amplitude of the audio signal at only said determined subset of the frequency range, the subset having a low expected signal to noise ratio at the time of measuring such that the measured amplitude is indicative of noise amplitude at that subset of the frequency range; and
    adapting a predefined noise spectral shape by fitting to the noise amplitude so as to form the estimated noise spectrum.

2. The method according to claim 1, wherein the audio signal is a frequency modulated audio signal, the method further comprising prior to the measuring step demodulating the frequency modulated audio signal to form a demodulated audio signal, wherein the measuring step is performed on the demodulated audio signal.

3. The method according to claim 1, wherein measuring amplitude comprises measuring a plurality of amplitudes of the audio signal, each at a different frequency in the subset of the frequency range.

4. The method according to claim 3, further comprising applying a frequency dependent weighting factor to each of the plurality of measured amplitudes to form a plurality of weighted measured amplitudes.

5. The method according to claim 4, wherein the combination of the plurality of weighted measured amplitudes is indicative of noise amplitude at the subset of the frequency range.

6. The method according to claim 5, comprising receiving the audio signal on each of a plurality of channels, further comprising measuring channel amplitude of the audio signal for each of the plurality of channels, wherein each measured channel amplitude is indicative of noise amplitude on that channel at the subset of the frequency range and wherein a weighted average of the measured channel amplitudes is indicative of noise amplitude at that subset of the frequency range.

7. The method according to claim 6, further comprising adapting at least one further predefined noise spectral shape by fitting to the noise amplitude so as to form at least one further estimated noise spectrum; and combining the estimated noise spectrum and the at least one further estimated noise spectrum so as to form a combined estimated noise spectrum.

8. The method according to claim 7, wherein combining the estimated noise spectrum and the at least one further estimated noise spectrum comprises determining a weighted average of the estimated noise spectrum and at least one further estimated noise spectrum.

9. The method according to claim 7, further comprising prior to the measuring step storing the predefined noise spectral shape and the at least one further predefined noise spectral shape.

10. The method according to claim 4, wherein applying a frequency dependent weighting factor to each of the plurality of measured amplitudes comprises multiplying the frequency dependent weighting factor by the logarithmic of each of the plurality of measured amplitudes.

11. The method according to claim 1, wherein fitting the predefined noise spectral shape to the noise amplitude comprises:
    comparing the noise amplitude and the predefined noise spectral shape in the subset of the frequency range; and
    fitting the predefined noise spectral shape in dependence on the comparison.

12. The method according to claim 11, wherein the comparing step comprises determining the difference between the noise amplitude and a weighted average of the logarithmic amplitude of the predefined noise spectral shape.

13. The method according to claim 1, further comprising adapting at least one further predefined noise spectral shape by fitting to the noise amplitude so as to form at least one further estimated noise spectrum; and combining the estimated noise spectrum and the at least one further estimated noise spectrum so as to form a combined estimated noise spectrum.

14. The method according to claim 13, wherein combining the estimated noise spectrum and the at least one further estimated noise spectrum comprises determining a weighted average of the estimated noise spectrum and at least one further estimated noise spectrum.

15. The method according to claim 13, further comprising prior to the measuring step storing the predefined noise spectral shape and the at least one further predefined noise spectral shape.

16. The method according to claim 1, further comprising:
    determining the noise amplitude at the subset of the frequency range; and
    applying a median filter to the noise amplitude at the subset of the frequency range to form a median filtered noise amplitude; wherein the adapting step is performed using the median filtered noise amplitude.

17. The method according to claim 1, further comprising:
    determining the noise amplitude at the subset of the frequency range; and
    applying a variable length median filter to the noise amplitude at the subset of the frequency range to form a variable length median filtered noise amplitude; wherein the adapting step is performed using the variable length median filtered noise amplitude.

18. The method according to claim 1, further comprising prior to the measuring step storing the predefined noise spectral shape.

19. The method according to claim 1, further comprising suppressing noise in the audio signal to form a noise suppressed audio signal by using the estimated noise spectrum.

20. The method according to claim 19, further comprising:
    combining the noise suppressed audio signal with the audio signal to form a combined signal; and
    outputting the combined signal.

21. An apparatus for estimating the noise spectrum of an audio signal, the audio signal occupying a frequency range, the apparatus comprising:
    a subset determination module configured to determine a subset of the frequency range of said audio signal at which to measure amplitude of the audio signal in dependence on the expected signal to noise ratio at the time of measuring at the subset of the frequency range;
    a measurement module configured to measure amplitude of the audio signal at only said determined subset of the frequency range, the subset having a low expected signal to noise ratio at the time of measuring such that the measured amplitude is indicative of noise amplitude at that subset of the frequency range; and an adapting module configured to adapt a predefined noise spectral shape by fitting to the noise amplitude so as to form the estimated noise spectrum.

22. The apparatus according to claim 21, further comprising:
   a noise determination module configured to determine the noise amplitude at the subset of the frequency range; and
   a median filter configured to filter the noise amplitude at the subset of the frequency range to form a median filtered noise amplitude; wherein the adapting module is configured to adapt the predefined noise spectral shape by fitting to the median filtered noise amplitude.

23. The apparatus according to claim 21, further comprising:
   a noise determination module configured to determine the noise amplitude at the subset of the frequency range; and
   a variable length median filter configured to filter the noise amplitude at the subset of the frequency range to form a variable length median filtered noise amplitude;
wherein the adapting module is configured to adapt the predefined noise spectral shape by fitting to the variable length median filtered noise amplitude.

24. The apparatus according to claim 21, wherein the measurement module is configured to measure channel amplitude of the audio signal on each of a plurality of channels;
   further comprising a mixing module configured to combine the measured channel amplitudes.

25. The apparatus according to claim 21, further comprising a noise suppression module configured to suppress noise in the audio signal to form a noise suppressed audio signal by using the estimated noise spectrum.

26. The method according to claim 1, wherein said subset of the frequency range at which to measure amplitude of the audio signal is determined dynamically by a receiver based on measured properties of a received audio signal.

27. The method according to claim 1, wherein said subset of the frequency range at which to measure amplitude of the audio signal is determined in advance of reception of the audio signal based on expected properties of the audio signal.

28. The apparatus according to claim 21, wherein said subset of the frequency range at which to measure amplitude of the audio signal is determined dynamically based on measured properties of a received audio signal.

29. The apparatus according to claim 21, wherein said subset of the frequency range at which to measure amplitude of the audio signal is determined in advance of reception of the audio signal based on expected properties of the audio signal.

* * * * *